Figure 1:
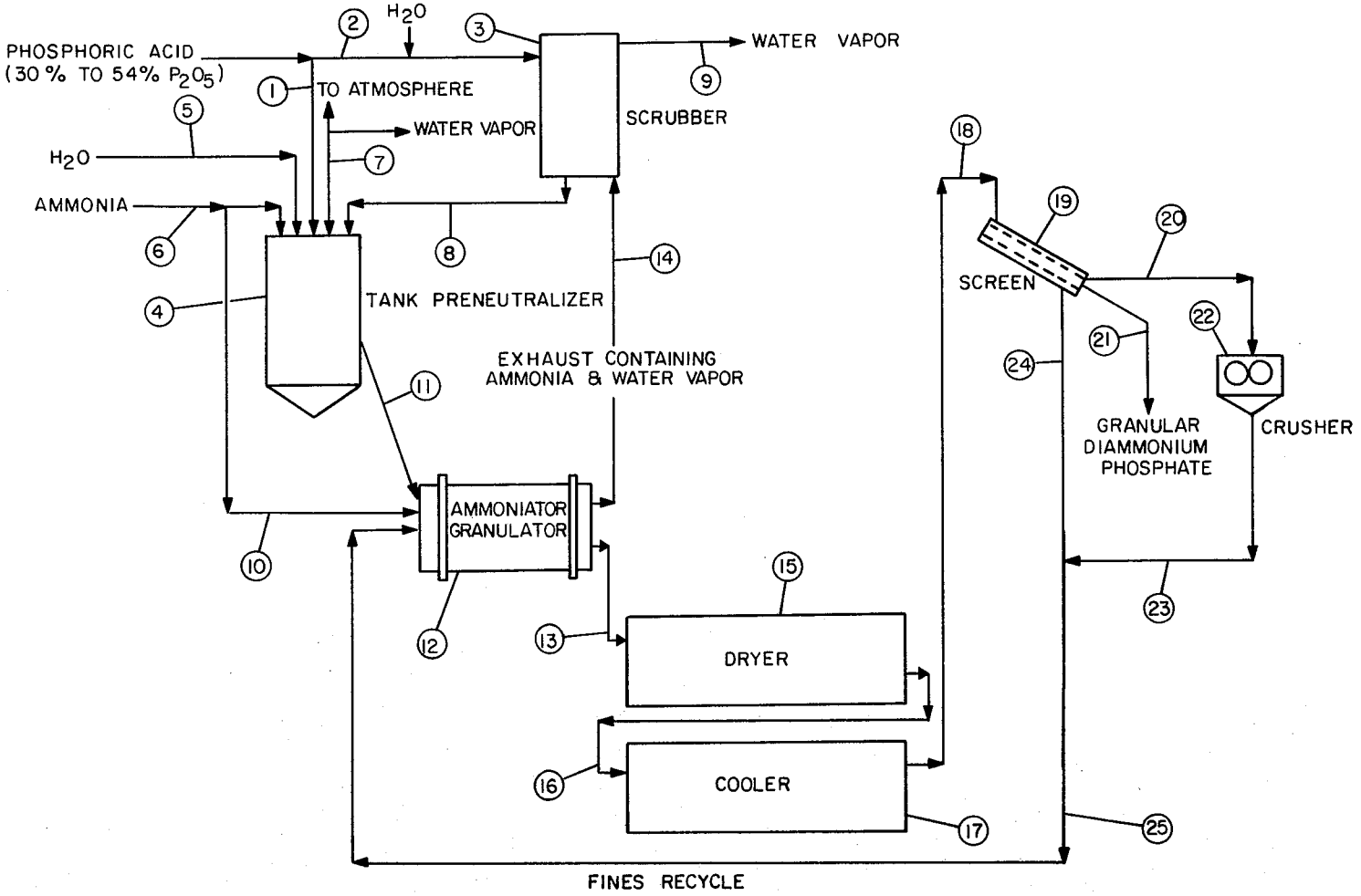
Figure 2:
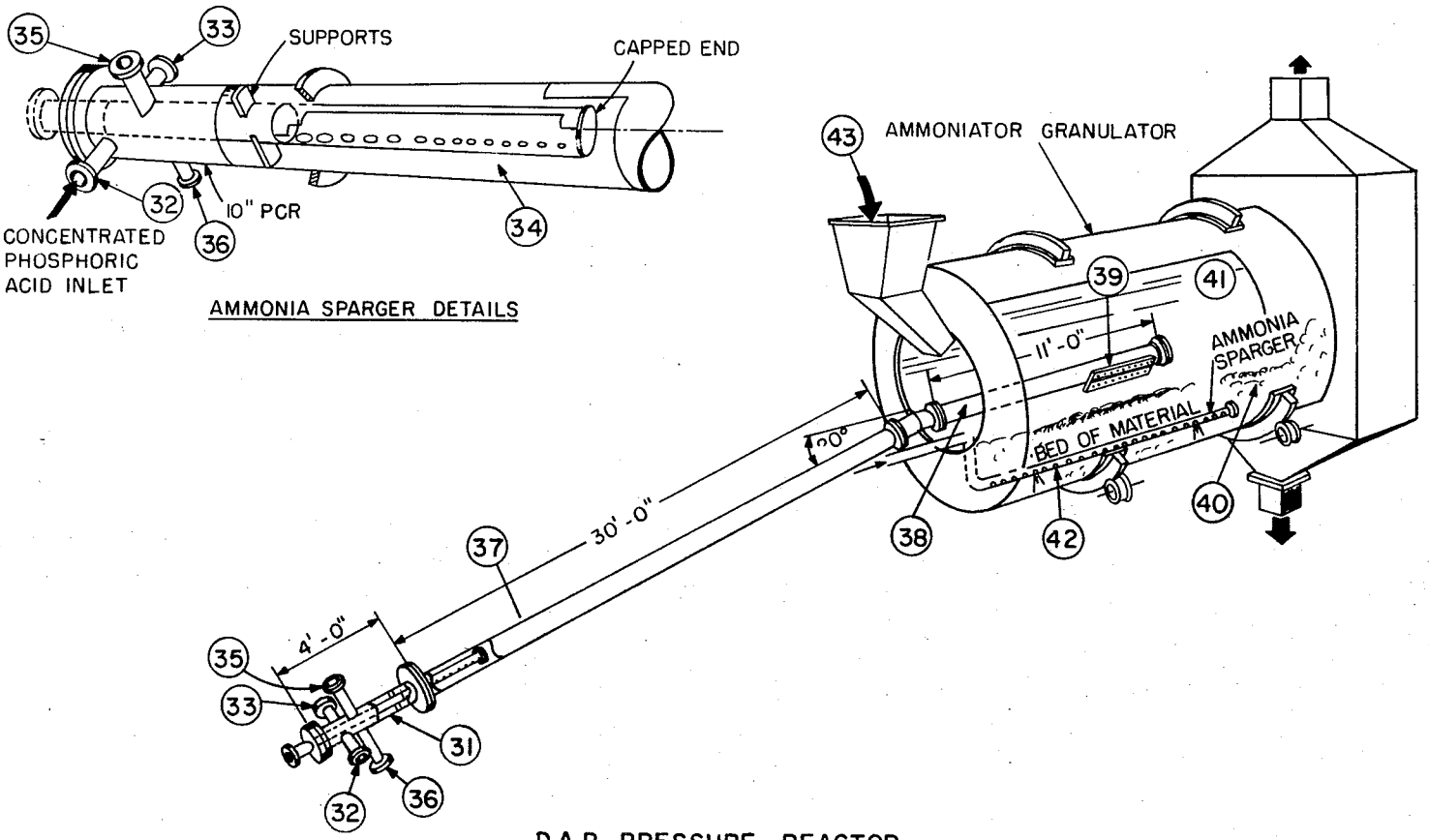

United States Defensive Publication [19] (H) [11] T104,201

Salladay et al. [43] May 1, 1984

[54] PRESSURE REACTOR FOR PRODUCING DIAMMONIUM PHOSPHATE

[76] Inventors: David G. Salladay, 520 Line St., NE., Decatur, Ala. 35601; Frank P. Achorn, Robbins Beach Rd., Killen, Ala. 35645

[21] Appl. No.: 538,714

[22] Filed: Oct. 3, 1983

[51] Int. Cl.[3] ..... C05B 7/00

[52] U.S. Cl. ..... 71/34; 71/43

[57] ABSTRACT

Process for producing diammonium phosphate (DAP) fertilizer from phosphoric and sulfuric acids, anhydrous ammonia and water in a specially designed reactor operated at high pressures to granulate diammonium phosphate at low recycle ratios and with either no, or relatively small, fossil fuel requirement drying per ton of product. By operating at elevated pressures, it is possible to force ammonia into a high temperature (250° to 300° F.) melt without exceeding the recovery capacity of the acid fed to the scrubber. The high pressure slurry from the reactor is forced into the bed of materials in a rotary granulator. Previously operated reactors employed pressures ranging from 0 to 10 psig pressures. This reactor operates at 40 to 80 psig. The process substantially increases production in existing DAP granulation plants and has helped reduce grade deficiencies. Also, use of this reactor for DAP production results in about the same levels of ammonia loss to the scrubber as the prior-art tank preneutralizer, higher operating factors, less maintenance and no transfer pump plugging. Operation is at a temperature of 250° F. to 300° F., or more, while the tank preneutralizer operates normally at 240° F.

7 Claims, 2 Sheets Drawing,

26 Pages Specification

The file of this unexamined application may be inspected and copies thereof may be purchased (849 O.G. 1221, Apr. 9, 1968).

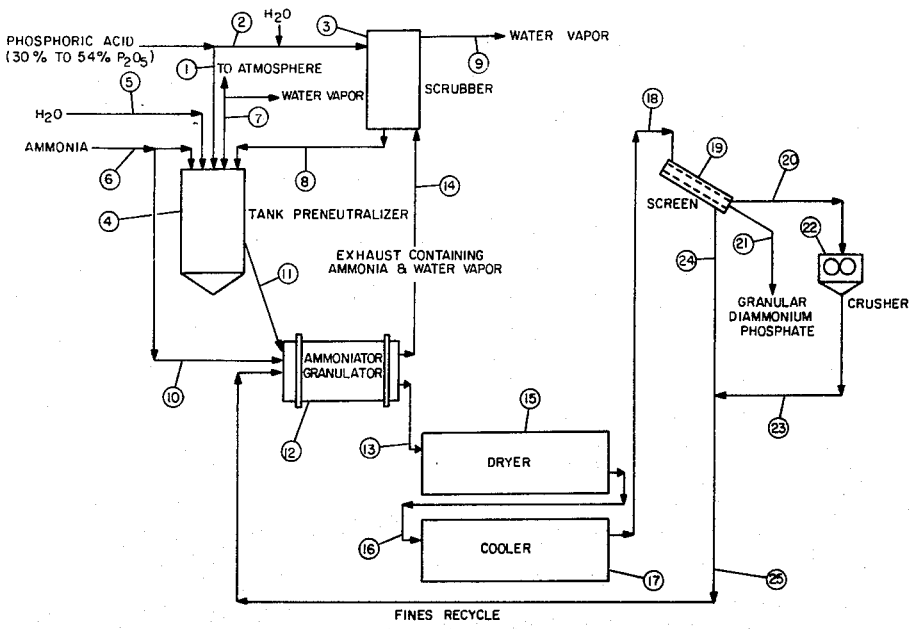

SHEET OF CONVENTIONAL PROCESS FOR PRODUCTION OF GRANULAR DIAMMONIUM PHOSPHATE

SHEET OF CONVENTIONAL PROCESS FOR PRODUCTION OF GRANULAR DIAMMONIUM PHOSPHATE

FIGURE I

DAP PRESSURE REACTOR